Patented May 30, 1944

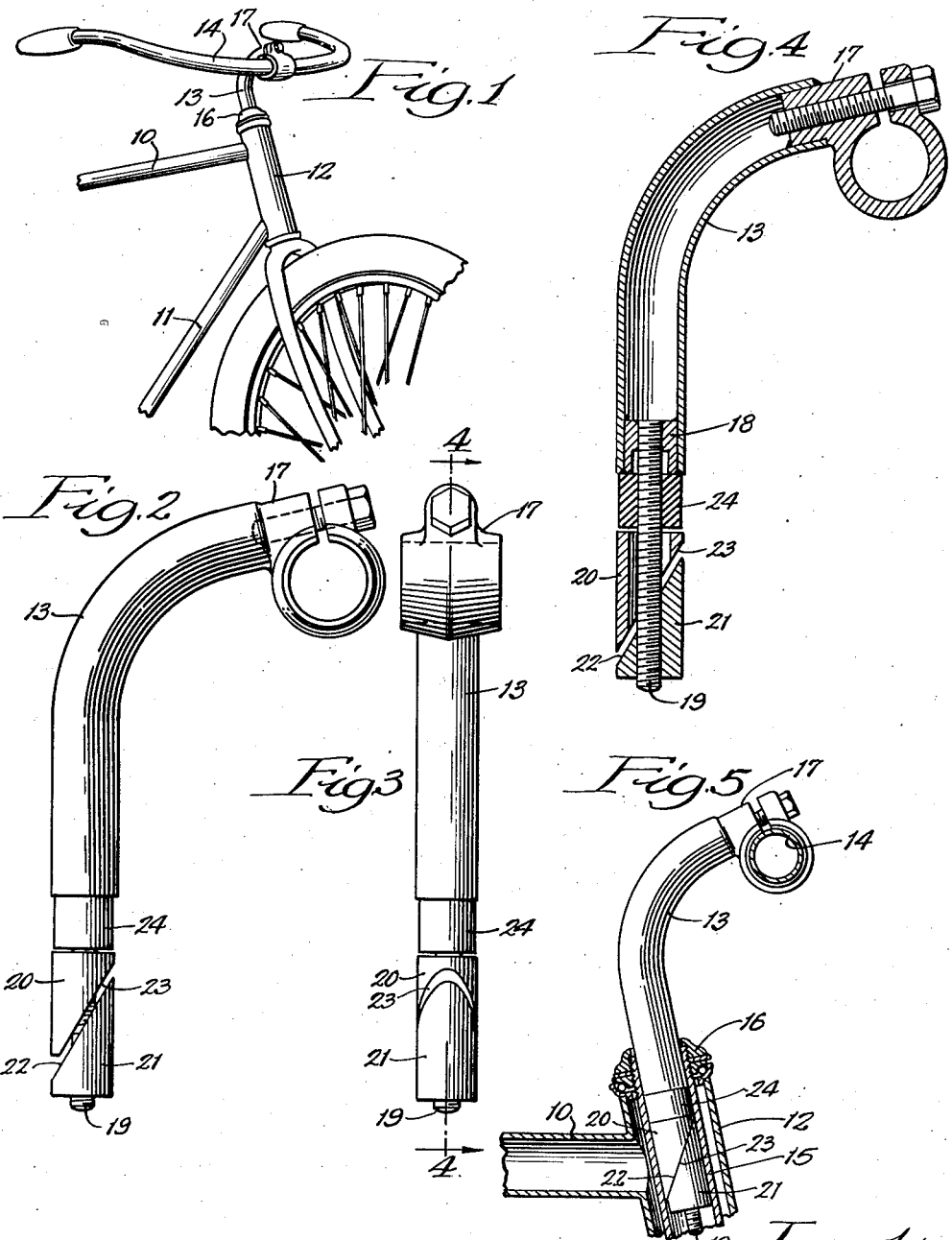

2,349,933

UNITED STATES PATENT OFFICE 2,349,933

COUPLING STRUCTURE

Cornelius J. Barry, Chicago, Ill., assignor to Superior Plating Works, Chicago, Ill., a corporation of Illinois Application March 25, 1943, Serial No. 480,476

6 Claims. (Cl. 287—54)

This invention relates to a coupling structure, and more particularly to a device for releasably securing or attaching the stem on which the handle bars of a bicycle are mounted to the frame post of the bicycle.

An object of the invention is to provide a simple effective releasable coupling or attachment. Another object is to provide a device for securing two sections of tubing in telescopic relation without the use of a conventional bolt for tightening and releasing the sections. Still another object is to provide a coupling structure which may be used with tubing and which does not require the use of forgings in the coupling structure. A further object is to provide a stem for supporting the handle bars of a bicycle which may be arcuate or curved in shape to provide a streamlined appearance and which at the same time is readily and releasably secured or attached to the frame post of the bicycle.

Other features and advantages will be apparent from the following specification and drawing, in which—

Fig. 1 is a fragmentary perspective view of the coupling structure in use on a bicycle; Fig. 2 is a side elevational view of a portion of the device; Fig. 3 is a front elevational view of the same portion of the device; Fig. 4 is a vertical sectional view taken along the line 4—4 of Fig. 3; and Fig. 5 is a view, partly in section, showing the assembly of the coupling structure.

The invention contemplates a coupling structure for securing a tubular stem, such as is used in supporting the handle bars of a bicycle, to a tubular casing, such as the frame post of the bicycle, and provides a locking shoe which is brought into locking engagement by rotation of the stem and may be released in the same manner. With this structure, the use of a bolt extending through the tubular stem and supported on a forging attached to the tubular portion of the stem, as has heretofore been used in conventional structures, is eliminated. Instead, the stem may be tubular and may be curved or arcuate, if desired.

In the embodiment of the invention described herein, the frame members 10 and 11 of the bicycle are secured to the frame post 12 which supports the stem 13. The handle bars 14 of the bicycle are mounted on the stem 13.

As seen particularly in Fig. 5, the frame post 12 is tubular and receives therein a tubular casing 15 which threadedly engages a conventional collar structure 16.

The stem 13 may be of any suitable type or construction and is preferably in the form of a metallic tube which may be bent or turned forwardly at the upper portion thereof and secured to a forging 17 which receives and supports the handle bars 14.

A plug 18 within the lower end of the tubular stem 13 is provided with a threaded stud 19 which extends from the central portion of the plug. The plug 18 and stud 19 may be secured in position within the stem 13 by welding, brazing, or other suitable means.

A locking shoe 20 may be of an outside diameter slightly less than the inside diameter of the tubular casing 15 so that the shoe may be loosely received within the casing. The shoe 20 is centrally apertured so that the stud 19 may pass therethrough. The aperture in the center of the shoe 20 is of a diameter considerably larger than the outside diameter of the stud 19. The shoe, therefore, is loosely received about the stud 19. The lower surface of the shoe 20 is cut along a line which is at an angle with respect to the wall of the casing 15 and provides in effect a bevel at an angle which, as shown, may be approximately 30° with respect to the wall of the casing.

A second shoe 21, which may be of approximately the same external dimensions as the shoe 20, is also centrally apertured and is internally threaded along the walls of the aperture so as to threadedly engage the stud 19. The upper surface of the shoe 21 is cut at an angle with respect to the wall of the casing 15 so as to provide a bevel which acts as a cam surface for engaging the shoe 20. Preferably, the beveled surfaces on the shoes 20 and 21 are complementary so as to engage each other along a substantial portion of these surfaces when the shoes are brought into engagement.

The tubular stem 13 is preferably of an outside diameter of slightly less than the inside diameter of the casing 15 so that the tubular stem 13 may be telescopically and snugly received within the tubular casing 15.

Immediately below the stem 13, a resilient bushing 24 of rubber or the like may be secured to the stud 19. This bushing serves as a cushion for engaging the shoe 20 when the stud 19 is rotated and the shoe 21 and shoe 20 are moved upwardly along the stud.

In the operation of the device, the stud 19 is passed through the locking shoe 20 and threadedly engages the shoe 21. The two shoes, the stud, and the end of the tubular stem 13 are placed in the casing 15, and the tubular stem is rotated about the axis of the stud 19. The shoe 21, by reason of its engagement with the shoe 20, does not rotate when the tubular stem 13 and stud 19 are rotated and, therefore, shifts longitudinally along the stud 19. As the shoe 21 shifts longitudinally along the stud 19 toward the stem 13, the beveled surface 22 of the shoe 21 engages the beveled surface 23 of the shoe 20 and urges the shoe 20 upwardly into engagement with the lower end of the bushing 24. When the upper end of the shoe 20 engages the lower end of the bushing 24, further upward movement of the shoe 21 shifts the locking shoe 20 laterally to bring it into tight locking engagement with the inner wall of the casing 15. In this manner, the tubular stem 13 is secured to the casing 15.

When the stem 13 is to be released from the casing 15, the stem 13 is rotated in the opposite or counter-clockwise direction about the axis of the stud 19, thus permitting the release of the stem 13 and shoes 20 and 21 from the casing 15.

With this coupling structure, the stem 13 is secured to the casing 15 merely by rotating the stem 13. This may be accomplished by turning the handle bars 14 of the bicycle. The threads on the stud 19 and shoe 20 should be so arranged that the member 13 will be tightened in position within the casing 15 when the handle bars are in the desired position.

With this structure, the tubular stem 13 may be secured at its upper end to a forging 17 which supports the handle members, but it is not necessary to use a forging to support a bolt for the locking structure. The elimination of the forging and the necessity for a straight tubular stem also permits the forming of an arcuate or streamlined tubular stem which is more attractive and which may be turned forwardly to provide greater clearance adjacent the handle bars of the bicycle.

Although the invention has been described in connection with a specific embodiment, it will be apparent that modifications and changes may be made without departing from the spirit and scope of the invention.

I claim:

1. A coupling structure comprising a tubular casing, a locking shoe within said casing, a stem having a threaded stud extending from the end thereof, at least a portion of said stem being disposed out of alignment with the axis of said stud and being rotatable thereabout, said stud being disposed in an end portion of said casing and extending beyond the shoe therein, and cam means carried by the portion of said stud extending beyond said shoe for engaging the shoe to bring the same into locking engagement with the casing when said stem is rotated about the axis of the stud.

2. A coupling structure comprising a tubular casing, a locking shoe within said casing, a stem having a threaded stud extending from the end thereof, at least a portion of said stem being disposed out of alignment with the axis of said stud, said stud being disposed in an end portion of the casing and extending beyond the shoe therein, a member threadedly engaging said stud within the casing and beyond said shoe and equipped with a cam surface for engaging the shoe, said stem being rotatable about the axis of said stud to shift the position of the member on the stud whereby the cam surface of the member urges the shoe into locking engagement with the casing.

3. A coupling structure comprising a tubular casing in the frame of a bicycle, a centrally-apertured shoe within said casing, a tubular stem for supporting the handle bars of a bicycle, said stem being equipped with a threaded stud extending from the end thereof, said stud being disposed within said casing and extending through the aperture in said shoe, a member threadedly engaging said stud within the casing and beyond the shoe therein and equipped with a cam surface for engaging the shoe, said tubular stem being rotatable about the axis of said stud to shift the position of the member on the stud whereby the cam surface of the member urges the shoe into locking engagement with the casing.

4. A coupling structure comprising a tubular casing, a centrally-apertured shoe within said casing, said shoe having an outer diameter slightly less than the inner diameter of said casing, a tubular stem having a threaded stud extending from the end thereof, said stud being disposed within said casing and extending through the aperture in said shoe, a second shoe threadedly engaging said stud within the casing and beyond said first-mentioned shoe, said second shoe being equipped with a cam surface for engaging said first-mentioned shoe, said tubular member being rotatable about the axis of the stud to shift the position of the second shoe on the stud whereby the cam surface of the second shoe urges the first shoe into locking engagement with the casing.

5. A coupling structure comprising a tubular casing, a centrally-apertured locking shoe within the casing, said shoe having an outer diameter slightly less than the inner diameter of the casing and having a beveled surface disposed at an angle with respect to the wall of the casing, a tubular stem having an outer diameter only slightly less than the inner diameter of said casing and adapted to be telescopically received within the end of the casing, said stem having a threaded stud extending from the central portion of the end of the stem through the aperture in said locking shoe, the diameter of the aperture in the locking shoe being substantially greater than the diameter of the stud whereby the shoe is loosely received on the stud, a second shoe threadedly engaging the end portion of the stud beyond said first-mentioned shoe and having a beveled cam surface engaging in complementary relation the beveled surface of the first shoe whereby rotation of the second shoe is prevented, said tubular stem being rotatable about the axis of the stud and rotating the stud to shift the position of the second shoe longitudinally with respect to the stud whereby engagement of the beveled surfaces of the shoes causes the locking shoe to be brought into locking engagement with the casing.

6. A coupling structure comprising a tubular casing, a centrally-apertured locking shoe within said casing, said shoe having an outer diameter slightly less than the inner diameter of said casing and having a beveled surface disposed at an angle with respect to the walls of the casing, an arcuate tubular stem having a substantially straight end portion and equipped with a threaded stud extending from the central portion of said end portion through the aperture in said shoe, said tubular stem being of substantially the same cross section as said casing and having an outer diameter slightly less than the inner diameter of said casing whereby the stem may be telescopically received within the casing, the diameter of the aperture in said locking shoe being substantially greater than the diameter of said stud whereby the shoe is loosely received on the stud, a second shoe threadedly engaging the end portion of said stud beyond said locking shoe and having a beveled cam surface engaging in complementary relation the beveled surface of the first shoe whereby rotation of the second shoe within the casing is prevented, said tubular stem being rotatable about the axis of the stud and rotating the stud to shift the position of the second shoe longitudinally with respect to the stud whereby engagement of the beveled surfaces causes the first shoe to be moved laterally into locking engagement with the casing.

CORNELIUS J. BARRY.